United States Patent [19]

Butler

[11] Patent Number: 4,711,575
[45] Date of Patent: Dec. 8, 1987

[54] NON-PENDULOUS COUNTER-BALANCED DITHER MECHANISM FOR LASER GYRO

[75] Inventor: Alfred L. Butler, Thousand Oaks, Calif.

[73] Assignee: Litton Systems, Inc., Beverly Hills, Calif.

[21] Appl. No.: 364,328

[22] Filed: Apr. 1, 1982

[51] Int. Cl.⁴ .......................... G01B 9/02; H01S 3/083
[52] U.S. Cl. ..................................... 356/350; 372/94; 372/107
[58] Field of Search ................... 356/350; 372/94, 107

[56] References Cited
U.S. PATENT DOCUMENTS

| 4,115,004 | 9/1978 | Hutchings et al. | 356/350 |
| 4,309,107 | 1/1982 | McNair et al. | 356/350 |
| 4,321,557 | 3/1982 | McNair | 356/350 |
| 4,436,423 | 3/1984 | Kumar et al. | 356/350 |

Primary Examiner—Stephen C. Buczinski
Attorney, Agent, or Firm—Roy L. Brown

[57] ABSTRACT

An improved laser gyro dither mechanism utilizing a three-spring suspension system which not only isolates dither vibrational energy generated within the gyro and prevents that energy from passing to the mounting case of the laser, but which, additionally, eliminates possible pendulous action by the suspended gyro mechanism. The gyro's ring laser is mounted about a center post in its case. A first spring member is connected between the ring laser an the center post at the top of the post. A second spring member is connected between a counterweight and the centerpost on the bottom of the post. A third spring member is connected between the ring laser and the counterweight on the bottom of the post to complete the suspension system.

9 Claims, 8 Drawing Figures

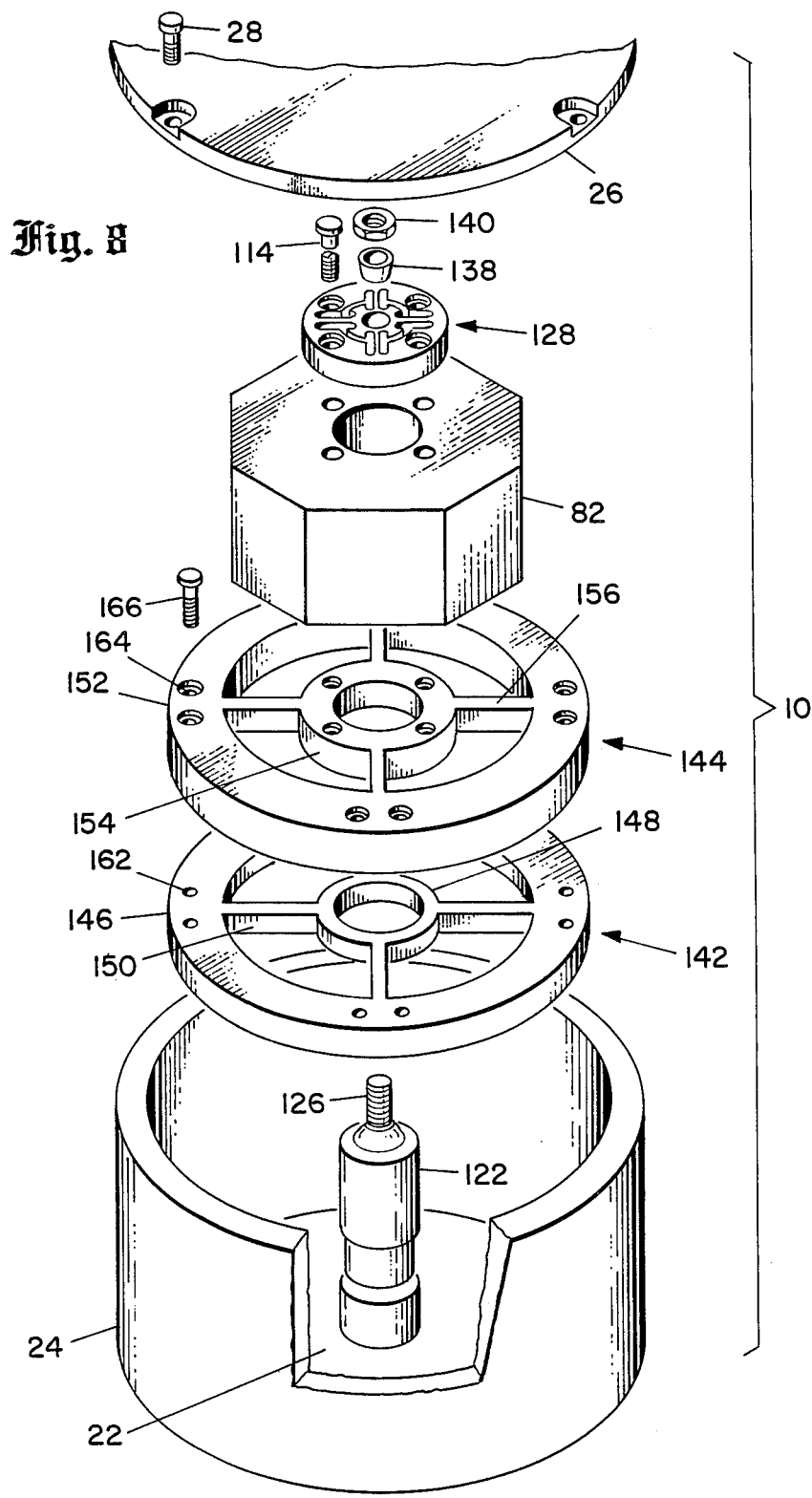

NON-PENDULOUS COUNTER-BALANCED DITHER MECHANISM FOR LASER GYRO

FIELD OF THE INVENTION

The present invention relates to laser gyroscopes that employ a drive mechanism to introduce a rotational movement about a central axis in a clockwise and counter-clockwise direction to create a so-called "dither" movement and, more particularly, to an improved arrangement for isolating the vibrational energies caused by such dither movement.

BACKGROUND OF THE INVENTION

Laser gyroscopes (gyros) use a ring laser in which two counterpropagating laser beams are supported in the same laser path. The difference in frequency between the two counterpropagating laser beams is a measure of angular velocity of the laser about its central or sensing axis. At low angular velocity about the sensing axis, the frequencies of the two counterpropagating beams lock together. To use the laser as an angular rate sensor for low angular velocity, it is customary to dither the ring laser by angularly oscillating the laser about the sensing axis relative to the supporting frame or case.

Dithering causes vibrations which, if transmitted to the case, can interfere with the other instruments or gyros within a navigational system. By using an isolation arrangement for each gyro, dither vibration is not transmitted to the other instruments. An example of one isolation system which reduces the transmitted vibrational energy of an oscillating gyro may be found in U.S. Pat. No. 4,115,004, by Hutchings, et al., which issued on Sept. 19, 1978, and which is assigned to the common assignee of this invention.

The isolation system shown within the aforementioned Hutchings, et al., patent utilizes a dual-spring system, see FIG. 1, which mounts a counterweight for isolating the oscillatory motion of the gyro. This spring system includes a first set of springs mounted between the frame or case and the gyro and a second set of springs mounted between the case and the counterweight. The dual-spring system of Hutchings, et al., works well under some conditions, but is not a practical system under all operating conditions (e.g., in the presence of temperature variations) due to the need to precisely match the springs of each system. The dual system can be fine-tuned in the laboratory but, as temperatures vary, the tuning is lost thereby causing an increased amount of vibrational energy to be transmitted to the case of the gyro. One reason it is difficult to tune a dual-spring system is because the gyro case must be attached precisely at the node between the two spring systems.

An Improved Laser Gyro Dither Mechanism is shown in co-pending application Ser. No. 111,154 filed Jan. 11, 1980, by F. McNair and T. M. Wirt now U.S. Pat. No. 4,309,107 which issued Jan. 5, 1982. This application is also assigned to the common assignee of the invention. The dither mechanism shown therein utilizes a three-spring system for: first, mounting a gyro to a housing or case; second, mounting the gyro to a counterweight; and, third, mounting the counterweight to the case, see FIG. 2. Through this three-spring arrangement, it is possible to isolate substantially all angular vibrational energy which would otherwise pass to the case of a laser.

The solution set forth in the aforementioned patent application of McNair/Wirt is to decouple the node from the case such that there is only one principle resonance, namely the two-mass, one-spring free resonance. The counter-balanced dither apparatus taught by the McNair/Wirt application, as shown in FIG. 3 herein, works for its intended purpose. However, it can be seen that the supporting springs for the laser body are beneath the center of gravity of that body. This configuration with the weight of the gyro above the springs, produces an undesirable pendulous action. That is, when the gyro is accelerated in a direction normal to the sensing axis, the laser can tilt like a pendulum. The tilt can be of such a degree that, during usual random vibration levels, the gyro cannot generate data.

SUMMARY OF THE INVENTION

Accordingly, it is the object of the present invention to provide a non-pendulous, counter-balanced dither mechanism which affords the benefits of the apparatus when in the aforementioned McNair/Wirt application but which eliminates the potential for undesired pendulous tilting possible with that apparatus.

Another object is to provide an improved dither mechanism which uniquely supports a ring laser on each side of its center of gravity to prevent pendulous motion of the laser when accelerated.

The foregoing objectives are accomplished in a laser gyro of the present invention by a construction using a laser case having a base with a center post disposed normal to the base and a ring laser having an aperture therethrough disposed within the case with the center post passing through the aperture. A first spring system is connected between the top of the ring laser and the top of the center post, while a second spring system is connected between a counterweight and the bottom of the center post. A third spring system connects the counterweight to the bottom of the ring laser to support the top and bottom of the laser and thus resist pendulous motion.

To provide the necessary support and flexibility, the three spring system mentioned above are configured as toroidal rings having inner hubs with web members interconnecting the toroidal rings to the inner hubs. The web members are thin and flexible in a plane which intersects the sensing axis of the gyro.

DESCRIPTION OF THE DRAWINGS

FIG. 8 is an exploded view of the apparatus of the present invention.

DESCRIPTION OF THE PREFERRED EMBODIMENT

Figure 1:
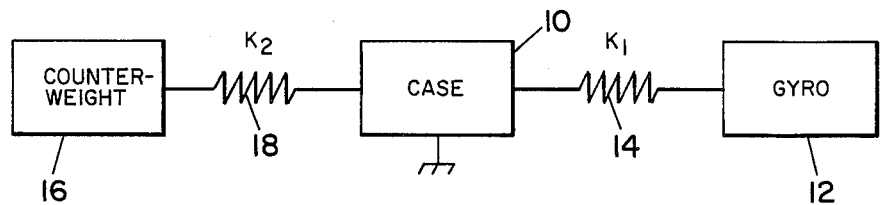
FIG. 1 is a simplified block diagram of a prior art two-spring mounting system.
Figure 2:
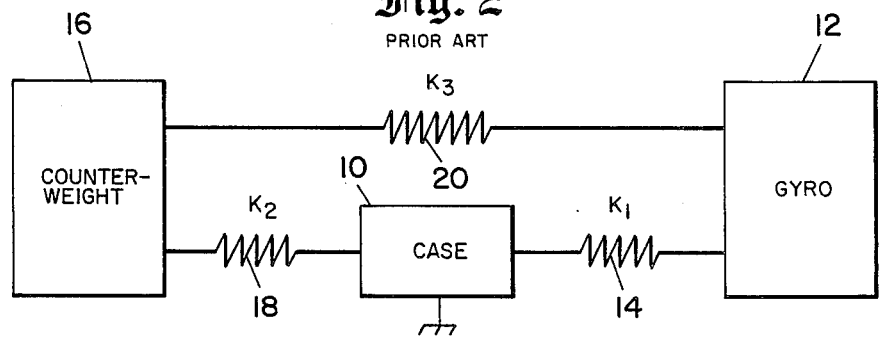
FIG. 2 is a simplified block diagram of a prior art three-spring mounting system.

FIG. 1 shows a two-spring system utilized within the Hutchings et al patent. A frame or base 10 is attached to a ring laser gyro 12 by a first spring system 14 illustrated as $K_1$. The case 10 is also attached to a counterweight 16 by a second spring system 18 illustrated as $K_2$. In FIG. 2, an improved three-spring system taught by the McNair/Writ patent application is shown. That is, the case 10 connects to the gyro 12 through a first spring system $K_1$; while the case connects to the counterweight 16 through a second spring system $K_2$. The counterweight 16, in turn, connects to the gyro 12 through a third spring system 20 illustrated as $K_3$.

Figure 3:
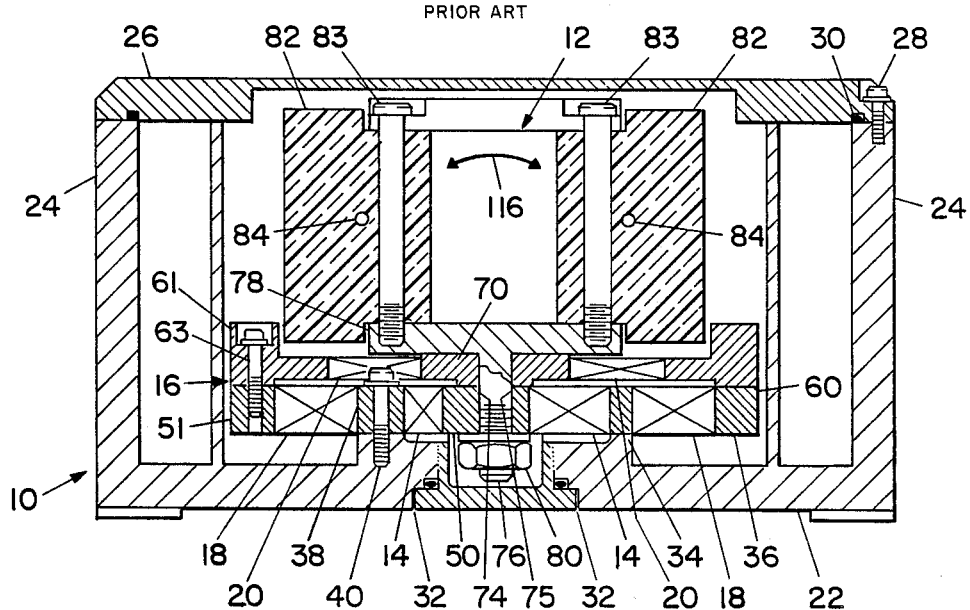
FIG. 3 is a cutaway detailed side elevation of an actual apparatus according to the basic configuration of FIG. 2.
Figure 4:
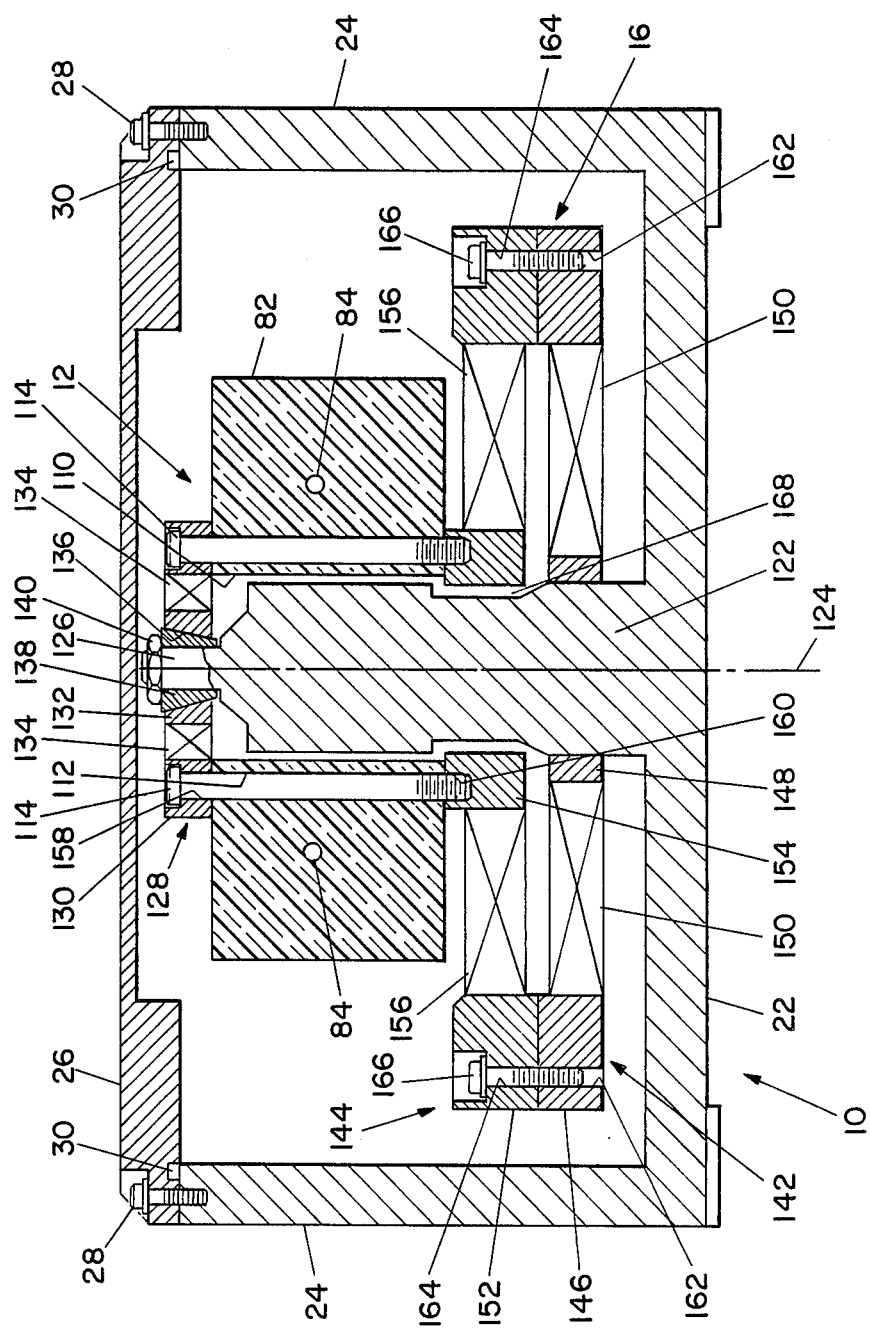
FIG. 4 is a detailed cutaway side elevation of the apparatus of the present invention.
Figure 5:
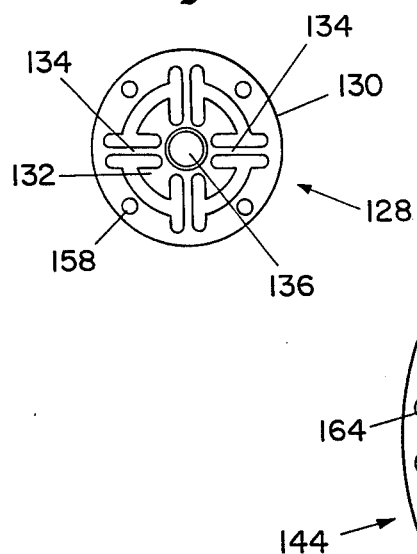
FIG. 5 is a plan view of the first spring system employed in the present invention.

Referring to FIG. 3, the prior art arrangment of the McNair/Writ patent application is shown in great detail with case 10 formed from a base 22 having sidewalls 24 that form a cavity closed by a rectangular cover 26 secured to the sidewalls 24 by screws 28 and sealed by an O-ring 30. Base 22 is provided with an aperture 32 surrounded by a toroidally-shaped mounting collar 34. Mounted upon the collar 34 is first flexure plate 36 which incorporates the first and second spring systems 14 and 18, respectively.

The flexure plate 36 consists of a first middle toroidal mounting ring 38 which is coaxially arranged with the case collar 34 and attached thereto by a plurality of screws 40; whereby, the middle ring 38 becomes part of the case 10. The first spring system 14 is comprised of four radially, inwardly directed webs 14 which attach the first middle toroidal ring 38 to an inner mounting hub 50 to which is mounted the gyro 12. The first middle toroidal ring 38 is also attached to an outer toroidal ring 51 by the second spring system 18 formed from four webs 18 which radiate from the first toroidal ring 38 outwardly toward the outer segmented toroidal ring 51. The outer toroidal ring 51 forms part of the counterweight 16 as will be described below.

Mounted to the first flexure plate 36 is a second flexure plate 60 having an outer toroidal ring 61 which is coaxially arranged with the outer toroidal ring 51 of the first flexure plate. The outer toroidal ring 61 is connected via the third spring system 20, formed by radially, inwardly directed webs 20, to an inner hub 70 which is coaxially arranged with the inner hub 50 of the first flexure plate.

The outer toroidal ring 61 of the second flexure plate 60 forms the second mass of the counterweight 16. This ring 61 is attached to the outer toroidal ring 51 by a plurality of screws 63. Each flexure plate 36 and 60 has a centrally located aperture 74 and 75, respectively, through which passes a flexure stud 76 which extends from the lower surface of a gyro mounting platform 78. The lowermost end of the stud 76 is threaded to receive a hex nut 80 which, in combination with screws 63 unite the first and second flexure plates 36 and 60 into a suspension assembly.

Mounted upon the gyro-mounting plate 78 by screws 83 is the gyro 12 which may be formed within a body 82, such as quartz, constructed with passageways 84 arranged within the body to form a rectangular or triangular laser path. The passageways 84 are sealed to retain a gas mixture as is known.

As stated above, the prior art arrangement of FIG. 3 works well in some circumstances. However, if the gyro 10 is accelerated in a direction normal to its sensing axis, a pendulous motion as shown by arrow 116 can be created.

The preferred embodiment of the present invention eliminates the pendulous motion. The preferred embodiment can best be understood by simultaneous reference to FIGS. 4–8 in which the case 10 has a base 22, side walls 24 and a center post 122 disposed normal to the base 22. Other components which bear the same reference characters as in FIG. 3 are described in greater detail hereinabove. The center post 122 is shown cylindrical in shape and is disposed about a sensing and dither axis 124. A threaded post 126 extends from the top of the center post 122 aligned with the axis 124. The body 82 of the laser has an aperture 110 therethrough. The body 82 is disposed about the center post 122 with the center post 122 passing through the aperture 110. To accomplish the objectives of the present invention, the laser body 82 is mounted to the center post 122 in the following manner.

Figure 6:
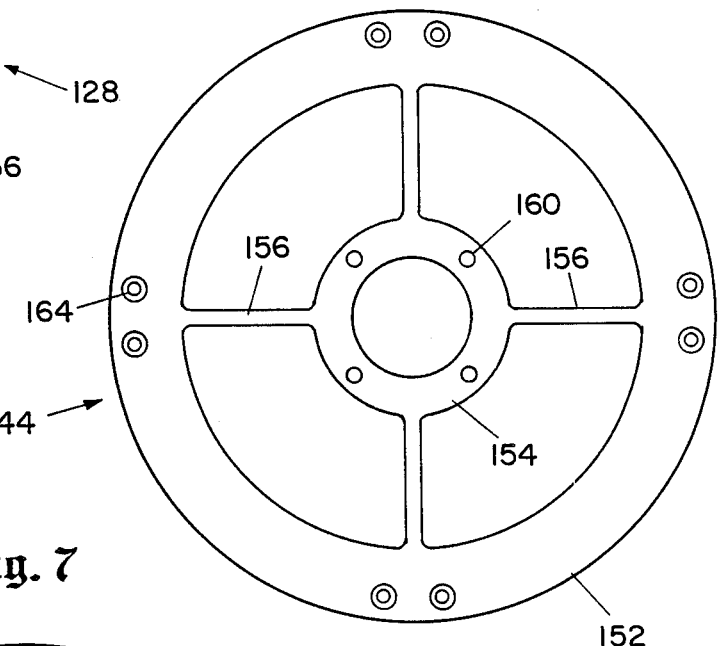
FIG. 6 is a plan view of the second spring system employed in the present invention.
Figure 7:
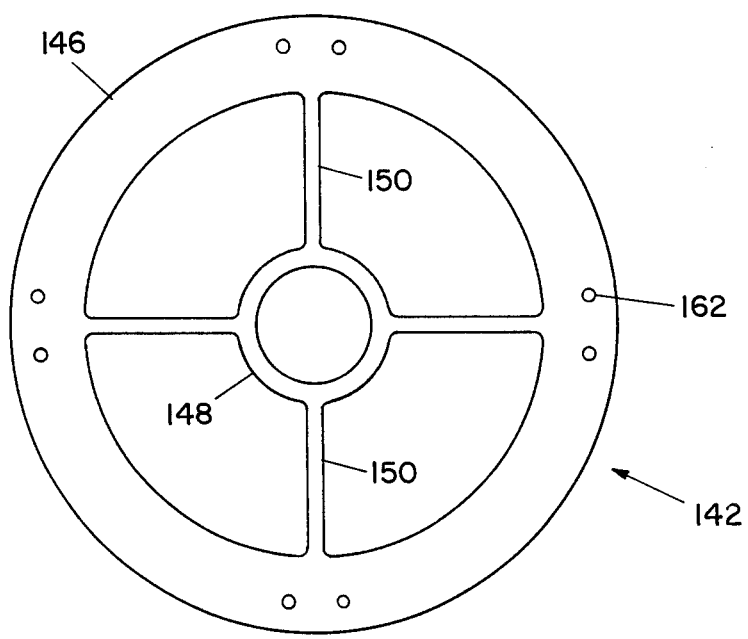
FIG. 7 is a plan view of the third spring system employed in the present invention.

It is preferred that the center post 122 be of a material having a very low coefficient of thermal expansion such as that sold under the trade name of INVAR or of Nickel 36. A first spring system, generally indicated as 128 suspends the body 82 from its top. First spring system 128 comprises a first toroidal ring 130 connected to a first inner hub 132 by web members 134. While inner hub 132 could be attached directly to the post 126 by cement or the like, it is preferred that the opening 136 of inner hub 132 be tapered in the manner shown and that a tapered collar 138 be disposed about the threaded post 126 and within opening 136 to be held therein tightly by a nut 140 threaded onto the post 126, as shown. The first spring system 128 is of unitary construction to be described hereinafter in FIG. 5 while the second and third spring systems are shown in FIGS. 6 and 7.

The laser body is supported on the bottom by a second spring system, generally indicated as 142, and a third spring system, generally indicated as 144, in cooperation. Second spring system 142 comprises a second toroidal ring 146 connected to a second inner hub 148 by web members 150. The thrid spring system 144 comprises a thrid toroidal ring 152 connected to a third inner hub 154 by web members 156. The third spring system 144 is disposed adjacent the bottom of the laser body 82 between the second spring system 142 and the first spring system 128. The inner hub 154 of the third spring system 144 is aligned with the first toroidal ring 130 of the first spring system 128. The first toroidal ring 130 has bores 158 therethrough in alignment with the bores 112 through the body 82. In similar manner, the inner hub 154 of the third spring system 144 has threaded bores 160 also aligned with bores 112. Screws 114 are disposed through the bores 158, 112, and threaded into bores 160 to hold the first spring system 128 and third spring system 144 together with the body 82 held in positional alignment therebetween.

The inner hub 148 of the second spring system 142 is attached to the center post 122 by an appropriate cement or by heat shrinking. The second and third toroidal rings 146, 152 are in alignment, have bores 162, 164, respectively, therethrough, and are connected together by screws 166.

To provide proper clearance for operation while providing the necessary alignment, the center post 122 has a circumferential groove 168 thereabout in the center of third inner hub 154. Any mismatch of thermal expansion between laser body 82 and the spring systems 128, 142 and 144 in a horizontal or vertical plane will be absorbed by the flexure of spring system web members 134, 150 and 156.

Turning now to the specific construction of the three unitary spring systems 128, 142, 144, reference should be made to FIGS. 6 and 8 which will be described with respect to the third spring system 144. The first spring system 128 and the second spring system 142 are of similar construction, so the specifics to be described hereinafter apply equally to them. The third spring system 144 has a rigid inner hub 154 and a rigid outer ring 152. Both hub 154 and ring 152 are generally toroidal in shape. The hub 154 and ring 152 are interconnected by the radial webs 156. Webs 156 are much thinner in width than in thickness as can be seen. As a result, they flex from rotational offset between the hub 154 and ring 152 in the plane of the spring system 144 while resisting flexing out of the plane of the spring system 144. As will be understood by those skilled in the art after reviewing FIGS. 5–7, the spring systems 128, 142, 144 may be manufactured with several variations from flat stainless steel plates or castings by appropriate milling operations. For example, the toroidal ring 152 shown as a continuous ring could also be constructed as four broken segments as well.

In operation, it will now be seen that the first spring system 128 secures the upper portion of laser body 82 to the center post 122, while the second spring system 144 secures the lower portion of laser body 82 to the axially aligned counterweight 16 formed by outer rings 152 (of the second spring system) and 146. The third spring system 142 then secures the counterweight 16 to the center post 122 to complete the mounting of laser body 82. The webs 134, 150 and 156 of the first, second and third spring systems 128, 142 and 144, respectively, form a set of rigid support columbs for the counterweight 16 and laser gyro 12 which prevent the pendulous motion of the body 82 of laser gyro 12 in a direction indicated by arrow 116 in FIG. 3. Yet, webs 134, 150 and 156 flex to permit a rotational movement of body 82 about axis 124.

During operation, the counterweight 16 rotates in a direction opposite to that of the laser body 12. The mass and angular amplitude of the counterweight 16 is such that the angular momentum of the laser gyro 10 is zero. Thus, no torque is transmitted to the centerpost 122. The flexure plane of the second and third spring systems, 142 and 144, is located on one side of the center of gravity of the laser body 82, while the flexure plate of the first spring system 128 is located on the other side of the center of gravity. This arrangement prevents the tilting of the body 82 about the sensing axis 124 and eliminates the undesirable pendulous motion experienced in the prior art devices.

Wherefore, having thus described my invention, I claim:

1. A laser gyro assembly, comprising:
  a ring laser having a sensing axis;
  a case for housing said ring laser, said case having a base with a center post disposed normal thereto and coaxially with said sensing axis;
  said ring laser having an aperture therethrough disposed within said case with said center post passing through said aperture;
  first spring means connected between said ring laser and said center post to mount said ring laser about said sensing axis to said case;
  a counterweight;
  second spring means connected between said counterweight and said center post to mount said counterweight to said case;
  third spring means mounting said ring laser about said sensing axis to said counterweight; and
  said first spring means being disposed along said sensing axis on the opposite side of said ring laser from said second and third spring means to support said ring laser against pendulous rotation from forces normal to said sensing axis.

2. A laser gyro as claimed in of claim 1, additionally comprising:
  said first spring means having a first toroidal ring with a first inner hub for mounting said first spring means to said center post, said first toroidal ring and said first inner hub being joined by radially extending web means disposed to be resiliently flexible about said sensing axis in a plane normal to said sensing axis;
  said second spring means having a second toroidal ring with a second inner hub for mounting said second spring means to said center post, said second toroidal ring and said second inner hub being joined by radially extending web means disposed to be resiliently flexible about said said sensing axis in a plane normal to said sensing axis; and
  said third spring means having a third toroidal ring with a third inner hub joined to said third toroidal ring by radially extending web means disposed to be resiliently flexible about said sensing axis in a plane normal to said sensing axis.

3. A laser gyro as claimed in claim 2, additionally comprising:
  said first toroidal ring and said third inner hub being concentric about said sensing axis and having said ring laser therebetween; and
  first connecting means connecting said first toroidal ring and said third inner hub for retaining said ring laser in place.

4. A laser gyro as claimed in claim 3, additionally comprising:
  said second and third toroidal rings being concentric about said sensing axis; and
  second connecting means connecting said second toroidal ring and said third toroidal ring to hold said rings together for forming said counterweight.

5. A laser gyro assembly, comprising:
  a ring laser having a sensing axis;
  a case for housing said ring laser;
  a counterweight;
  first spring means mounting said ring laser to said case;
  second spring means mounting said counterweight to said case;
  third spring means mounting said ring laser to said counterweight;
  said case having a base with a center post;
  said ring laser having an aperture therethrough being disposed within said case with said center post passing through said aperture;
  said first spring means connected between said ring laser and said center post;
  said second spring means connected between said counterweight and said center post; and
  said first and third spring means positioned along the sensing axis on opposite sides of the center of mass of said ring laser whereby said ring laser is supported against pendulous rotation from forces normal to said sensing axis.

6. A laser gyro as claimed in claim 5, wherein:

said first spring means comprises a first toroidal ring having a first inner hub for mounting said first spring means to said center post, said first toroidal ring and said first inner hub being joined by radially extending web means resiliently flexible about said sensing axis in a plane normal to said sensing axis;

said second spring means comprises a second toroidal ring having a second inner hub for mounting said second spring means to said center post, said second toroidal ring and said second inner hub being joined by radially extending web means resilient flexible about said sensing axis in a plane normal to said sensing axis; and, said third spring means comprises a third toroidal ring having a third inner hub joined to said third toroidal ring by radially extending web means resiliently flexible about said sensing axis in a plane normal to said sensing axis.

7. A laser gyro as claimed in claim 6, additionally comprising:

said first toroidal ring and said third inner hub are concentric with said ring laser axially positioned therebetween; and first connecting means connected between said first toroidal ring and said third inner hub for holding said ring laser in place.

8. A laser gyro as claimed in claim 7, additionally comprising:

said second toroidal ring and said third toroidal ring are concentric; and second connecting means connected between said second toroidal ring and said third toroidal ring to hold them together to form said counterweight.

9. A laser gyro assembly comprising:

a ring laser having a sensing axis;

a case for housing said ring laser;

a counterweight;

first spring means mounting said ring laser to said case;

second spring means mounting said counterweight to said case;

third spring means mounting said ring laser to said counterweight;

said first and third spring means axially positioned on opposite sides of said ring laser to support said ring laser against pendulous rotation from forces and accelerations normal to said sensing axis;

said case having a base with a center post coincident with said sensing axis;

said ring laser having an aperture therethrough disposed within said case with said center post passing through said aperture;

said first spring means connected between said ring laser and said center post, said first spring means comprising a first toroidal ring having a first inner hub for mounting said first spring means to said center post, said first toroidal ring and said first inner hub joined by radially extending web means resiliently flexible about said sensing axis in a plane normal to said sensing axis;

said second spring means connected between said counterweight and said center post, said second spring means comprising a second toroidal ring having a second inner hub for mounting said second spring means to said center post, said second toroidal ring and said second inner hub joined by radially extending web means resiliently flexibile about said sensing axis in a plane normal to said sensing axis;

said third spring means connected between said ring laser and said counterweight, said third spring means comprising a third toroidal ring having a third inner hub joined to said third toroidal ring by radially extending web means resiliently flexible about said sensing axis in a plane normal to said sensing axis;

said first toroidal ring and said third inner hub having said ring laser axially positioned therebetween;

first connecting means between said first toroidal ring and said third inner hub for holding said ring laser in place;

said second toroidal ring and said third toroidal ring being concentric about said sensing axis; and second connecting means between said second toroidal ring and said third toroidal ring to hold said rings together to form said counterweight.

* * * * *